US010447585B2

(12) United States Patent
Song

(10) Patent No.: US 10,447,585 B2
(45) Date of Patent: Oct. 15, 2019

(54) PROGRAMMABLE AND LOW LATENCY SWITCH FABRIC FOR SCALE-OUT ROUTER

(71) Applicant: Futurewei Technologies, Inc., Plano, TX (US)

(72) Inventor: Haoyu Song, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/409,222

(22) Filed: Jan. 18, 2017

(65) Prior Publication Data

US 2018/0176152 A1     Jun. 21, 2018

Related U.S. Application Data

(60) Provisional application No. 62/436,263, filed on Dec. 19, 2016.

(51) Int. Cl.
*H04L 1/00* (2006.01)
*H04L 12/753* (2013.01)

(52) U.S. Cl.
CPC .................... *H04L 45/48* (2013.01)

(58) Field of Classification Search
None
See application file for complete search history.

(56) References Cited

U.S. PATENT DOCUMENTS

| 7,102,999 | B1* | 9/2006 | Sindhu | H04L 49/3072 370/235 |
| 7,505,458 | B2* | 3/2009 | Menon | H04L 12/40058 370/389 |
| 9,736,063 | B2* | 8/2017 | Wan | H04L 45/34 |
| 2005/0243825 | A1 | 11/2005 | Bitar et al. | |
| 2007/0233896 | A1* | 10/2007 | Hilt | H04L 47/10 709/238 |
| 2009/0310610 | A1* | 12/2009 | Sandstrom | H04L 45/00 370/392 |
| 2014/0036918 | A1 | 2/2014 | Varvello et al. | |

(Continued)

FOREIGN PATENT DOCUMENTS

CN    103188157 A    7/2013

OTHER PUBLICATIONS

"International Application Serial No. PCT/CN2017/116600, International Search Report dated Feb. 26, 2018", 4 pgs.

(Continued)

*Primary Examiner* — Kwang B Yao
*Assistant Examiner* — Juvena W Loo
(74) *Attorney, Agent, or Firm* — Schwegman Lundberg & Woessner, P.A.

(57) ABSTRACT

A router device comprises a memory storage storing a database with network path information and a plurality of network interface line cards. The plurality of network interface line cards receive data through a network interface of a first line card addressed to a second line card; determine a path through at least one switch from the first line card to the second line card based on the network path information stored in the database; and forward the data, the address of the second line card, and the path information to the second line card from the first line card through the at least one switch.

19 Claims, 8 Drawing Sheets

(56) References Cited

U.S. PATENT DOCUMENTS

| | | | |
|---|---|---|---|
| 2014/0189156 A1* | 7/2014 | Morris | H04L 45/745 709/238 |
| 2014/0241345 A1* | 8/2014 | DeCusatis | H04L 49/25 370/355 |
| 2017/0163775 A1* | 6/2017 | Ravi | H04L 69/326 |

OTHER PUBLICATIONS

"International Application Serial No. PCT/CN2017/116600, Written Opinion dated Feb. 26, 2018", 4 pgs.

* cited by examiner

400

| PATH TABLE | | | | | |
|---|---|---|---|---|---|
| SOURCE | DESTINATION | PATH | | | |
| A | B | L1 | B | NULL | NULL |
| A | B | L2 | B | NULL | NULL |
| A | H | L1 | S1 | L3 | H |
| A | H | L1 | S1 | L4 | H |
| A | H | L1 | S2 | L3 | H |
| A | H | L1 | S2 | L4 | H |
| A | H | L2 | S1 | L3 | H |
| A | H | L2 | S1 | L4 | H |
| A | H | L2 | S2 | L3 | H |
| A | H | L2 | S2 | L4 | H |

| USAGE TABLE | |
|---|---|
| SWITCH | FILL DEPTH |
| L1 | 3 |
| L2 | 0 |
| L3 | 1 |
| L4 | 4 |
| S1 | 2 |
| S2 | 5 |

*FIG. 4*

PROGRAMMABLE AND LOW LATENCY SWITCH FABRIC FOR SCALE-OUT ROUTER

CLAIM OF PRIORITY

This application claims the benefit of priority under 35 U.S.C. § 119(e) to U.S. Provisional Patent Application Ser. No. 62/436,263, filed on Dec. 19, 2016, which is hereby incorporated by reference herein in its entirety.

TECHNICAL FIELD

The present disclosure is related to routing data packets within a router, and in particular to programmable and low latency switch fabrics for scale-out routers.

BACKGROUND

Scale-up routers use integrated hardware and software designs sold together by a single vendor. This tight integration between hardware and software provides good performance, but adding more capacity requires buying additional routers from the same vendor. This vendor lock-in effect increases costs for users.

Scale-out routers use off-the-shelf hardware and commodity software to provide routing functionality. Increasing capacity is cost-effective, but the loose integration between hardware and software adds substantial overhead, increasing the latency of scale-out routers compared to scale-up routers.

SUMMARY

A router device comprises a memory storage storing a database with network path information and a plurality of network interface line cards. The plurality of network interface line cards receive data through a network interface of a first line card addressed to a second line card; determine a path through at least one switch from the first line card to the second line card based on the network path information stored in the database; and forward the data, the address of the second line card, and the path information to the second line card from the first line card through the at least one switch.

A router-implemented method for routing data comprises, by a first line card of a plurality of line cards: receiving data via a network interface of the first line card, the data being addressed to a second line card of the plurality of line cards; looking up, in a database, path information for a path through a plurality of switches to the second line card; and sending the path information and the data to a first switch on the path.

A non-transitory computer-readable media stores computer instructions that, when executed by a first line card of a plurality of line cards, cause the first line card to perform the steps of: receiving data via a network interface of the first line card, the data being addressed to a second line card of the plurality of line cards; looking up, in a database, path information for a path through a plurality of switches to the second line card; and sending the path information and the data to a first switch on the path.

In example 1, a router device comprises a memory storage storing a database with network path information; and a plurality of network interface line cards that: receive data through a network interface of a first line card addressed to a second line card; determine a path through at least one switch from the first line card to the second line card based on the network path information stored in the database; and forward the data, the address of the second line card, and the path information to the second line card from the first line card through the at least one switch.

Example 2 comprises the router device of example 1, wherein the first switch on the path: receives the path information and the data from the first line card; determines, from the path information, a second switch on the path; and sends the path information and the data to the second switch on the path.

Example 3 comprises the router device of example 2, wherein the second switch on the path: receives the path information and the data from the first switch on the path; determines, from the path information, a third switch on the path; and sends the path information and the data to the third switch on the path.

Example 4 comprises the router device of example 3, wherein the third switch on the path: receives the path information and the data from the second switch on the path; identifies, from the path information, the second line card; and sends the data to the second line card.

Example 5 comprises the router device of any of examples 1 to 4, wherein the first line card of the plurality of line cards further: accesses congestion data of one or more of the switches; looks up, in the database, a second path through the plurality of switches to the second line card; and selects either the path or the second path based on the accessed congestion data.

Example 6 comprises the router device of example 5, wherein the congestion data comprises a fill depth for each switch of the one or more of the switches.

Example 7 comprises the router device of any of examples 1 to 6, wherein the memory storage comprising the database is integrated into the first line card.

Example 8 comprises the router device of any of examples 1 to 7, wherein the memory storage comprising the database is accessible by each of the plurality of line cards.

Example 9 comprises the router device of any of examples 1 to 8, wherein each switch of the plurality of switches comprises a programmable data plane chip.

In example 10, a router-implemented method for routing data comprises: by a first line card of a plurality of line cards: receiving data via a network interface of the first line card, the data being addressed to a second line card of the plurality of line cards; looking up, in a database, path information for a path through a plurality of switches to the second line card; and sending the path information and the data to a first switch on the path.

Example 11 comprises the router-implemented method of example 10, further comprising: by the first switch on the path: receiving the path information and the data from the first line card; determining, from the path information, a second switch on the path; and sending the path and the data information to the second switch on the path.

Example 12 comprises the router-implemented method of example 11, further comprising: by the second switch on the path: receiving the path information and the data from the first switch on the path; determining, from the path information, a third switch on the path; and sending the path information and the data to the third switch on the path.

Example 13 comprises the router-implemented method of example 12, further comprising: by the third switch on the path: receiving the path information and the data from the second switch on the path; identifying, from the path information, the second line card; and sending the data to the second line card.

Example 14 comprises the router-implemented method of example 13, further comprising: by the first line card of the plurality of line cards: accessing congestion data of one or more of the switches; looking up, in the database, a second path through the plurality of switches to the second line card; and selecting either the path or the second path based on the accessed congestion data.

Example 15 comprises the router-implemented method of example 14, wherein the congestion data comprises a fill depth for each switch of the one or more of the switches.

Example 16 comprises the router-implemented method of examples 10 to 15, wherein the database is stored in a non-transitory memory storage that is integrated into the first line card.

Example 17 comprises the router-implemented method of examples 11 to 16, wherein the database is stored in a non-transitory memory storage that is accessible by each of the plurality of line cards.

In example 18, a non-transitory computer-readable media stores computer instructions that, when executed by a first line card of a plurality of line cards, cause the first line card to perform the steps of: receiving data via a network interface of the first line card, the data being addressed to a second line card of the plurality of line cards; looking up, in a database, path information for a path through a plurality of switches to the second line card; and sending the path information and the data to a first switch on the path.

Example 19 comprises the non-transitory computer-readable media of example 18, wherein the steps further comprise: accessing congestion data of one or more of the switches; looking up, in the database, a second path through the plurality of switches to the second line card; and selecting either the path or the second path based on the accessed congestion data.

Example 20 comprises the non-transitory computer-readable media of example 19, wherein the congestion data comprises a fill depth for each switch of the one or more of the switches.

BRIEF DESCRIPTION OF THE DRAWINGS

FIG. 4 is a block diagram illustrating a database schema for use in a scale-out router, according to some example embodiments.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer-readable media or a computer readable storage device such as one or more non-transitory memories or other type of hardware based storage devices, either local or networked. The software may be executed on a digital signal processor, application-specific integrated circuit (ASIC), programmable data plane chip, field-programmable gate array (FPGA), microprocessor, or other type of processor operating on a computer system, such as a switch, server, or other computer system, turning such computer system into a specifically programmed machine.

A programmable and low latency switch fabric for a scale-out router provides for use of commodity hardware parts to realize performance comparable to that of scale-up routers while enjoying scalability advantages of existing scale-out routers.

Figure 1:
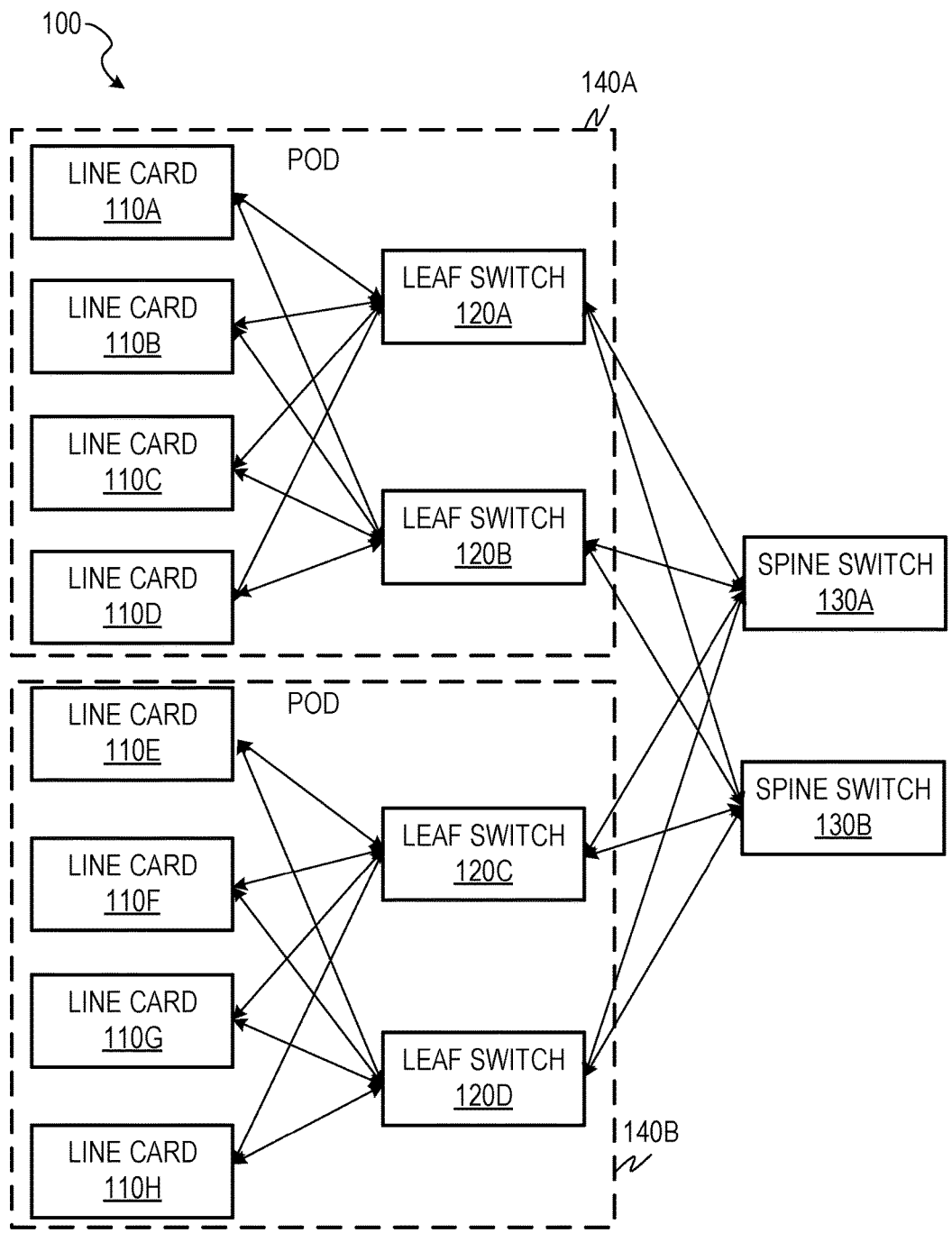
FIG. 1 is a block diagram illustrating a scale-out router, according to some example embodiments.

FIG. 1 is a block diagram illustrating a scale-out router 100, according to some example embodiments. The scale-out router 100 includes line cards 110A, 110B, 110C, 110D, 110E, 110F, 110G, and 110H, leaf switches 120A, 120B, 120C, and 120D, and spine switches 130A-130B. Line cards 110A-110D and leaf switches 120A-120B form a pod 140A. Line cards 110E-110H and leaf switches 120C-120D form a pod 140B. As shown in FIG. 1, the data paths between connected line cards 110A-110H, leaf switches 120A-120D, and spine switches 130A-130B are bidirectional. Thus, data packets may be transmitted in either direction between any pair of line cards 110A-110A via one or more of the leaf switches 120A-120D and spine switches 130A-130B.

At least two of the line cards 110A-110H are connected via a network to other computing devices. The scale-out router 100 routes data packets between the line cards 110A-110H to provide connectivity between the network-connected computing devices. In some example embodiments, the line cards 110A-110H, the leaf switches 120A-120D, and the spine switches 130A-130B are each implemented on the same type of hardware. For example, the line cards 110A-110H may be switches using programmable data plane chips in the network-facing role of line cards and the leaf switches 120A-120D and the spine switches 130A-130B are also switches using programmable data plane chips, but are in the back plane switch fabric role of routing packets within the scale-out router.

As shown in the example scale-out router 100, each of the line cards 110A-110H is connected to two of the four leaf switches 120A-120D. Similarly, each of the leaf switches 120A-120D is connected to both of the spine switches 130A-130B. Thus, there are multiple paths available to direct data from one line card to another. In various example embodiments, more or fewer connections are used at each level, more or fewer switches are used at each level, and more or fewer levels are used.

Data being transmitted between two line cards within the same pod may be transmitted using a shorter path than data transmitted between two line cards in different pods. For example, one path between the line card 110A and the line card 110D uses only the leaf switch 120A as an intermediary. However, a shortest path between the line card 110A and the line card 110E uses the leaf switch 120A, the spine switch 130A, and the leaf switch 120C as intermediaries. The line card 110A may use the path table 410 of the database schema 400 shown in FIG. 4 to identify one or more available paths to the destination. In some cases, a longer path may be selected based on relative congestion levels of the various paths.

Multicast datagrams may also be supported. When a multicast datagram is received, line cards connected to devices that have subscribed to the multicast group of the multicast datagram are identified and a copy of the data is sent to each identified line card. For example, if devices connected to the line cards 110B and 110H have both subscribed to the multicast group identified by IP address 225.001.001.001 and a data packet addressed to that IP address is received by the line card 110A, the data packet may be duplicated by the line card 110A and the methods described herein may be used to route the two packets to their two destination line cards.

Figure 2:
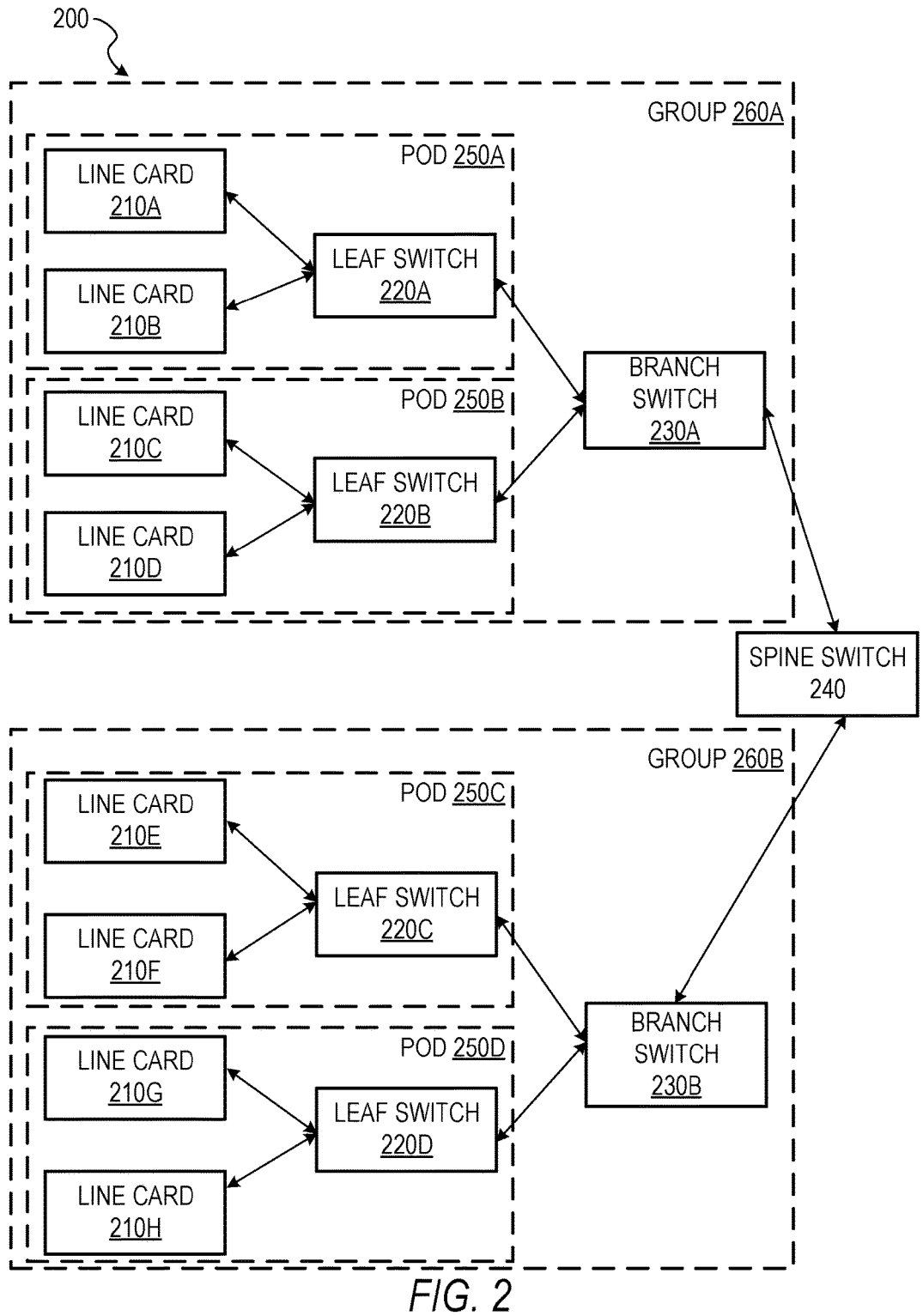
FIG. 2 is a block diagram illustrating a scale-out router, according to some example embodiments.

FIG. 2 is a block diagram illustrating a scale-out router 200, according to some example embodiments. The scale-out router 200 includes line cards 210A, 210B, 210C, 210D, 210E, 210F, 210G, and 210H, leaf switches 220A, 220B, 220C, and 220D, branch switches 230A-230B, and spine switch 240. Line cards 210A-210B and leaf switch 220A form a pod 250A. Line cards 210C-210D and leaf switch 220B form a pod 250B. Line cards 210E-210F and leaf switch 220C form a pod 250C. Line cards 210G-210H and leaf switch 220D form a pod 250D. The pods 250A-250B and the branch switch 230A form the group 260A. The pods 250C-250D and the branch switch 230B form the group 260B.

At least two of the line cards 110A-110H are connected via a network to other computing devices. Like the scale-out router 100, the scale-out router 200 routes data between the line cards 110A-110H to provide connectivity between the network-connected computing devices.

As shown in the example scale-out router 200, each of the line cards 110A-110H is connected to one of the four leaf switches 120A-120D.

Similarly, each of the leaf switches 120A-120D is connected to one of the branch switches 230A-230B and each of the branches 230A-230B is connected to the spine 240. Thus, in the example of the scale-out router 200, only one shortest path is available between each pair of line cards. By comparison with the example scale-out router 100, the scale-out router 200 uses one additional level (represented by the branch switches 230A-230B and the groups 260A-260B), with fewer connections between switches (one upward connection for each switch instead of two). In various example embodiments, other combinations of numbers of connections, numbers of levels, and numbers of switches at each level are used.

As with the scale-out router 100, data being transmitted between two line cards within the same pod may be transmitted using a shorter path than data transmitted between two line cards in different pods. Similarly, transmission between line cards within the group 260A or 260B traverses one of the branch switches 230A or 230B without needing to traverse the spine switch 240.

Figure 3:
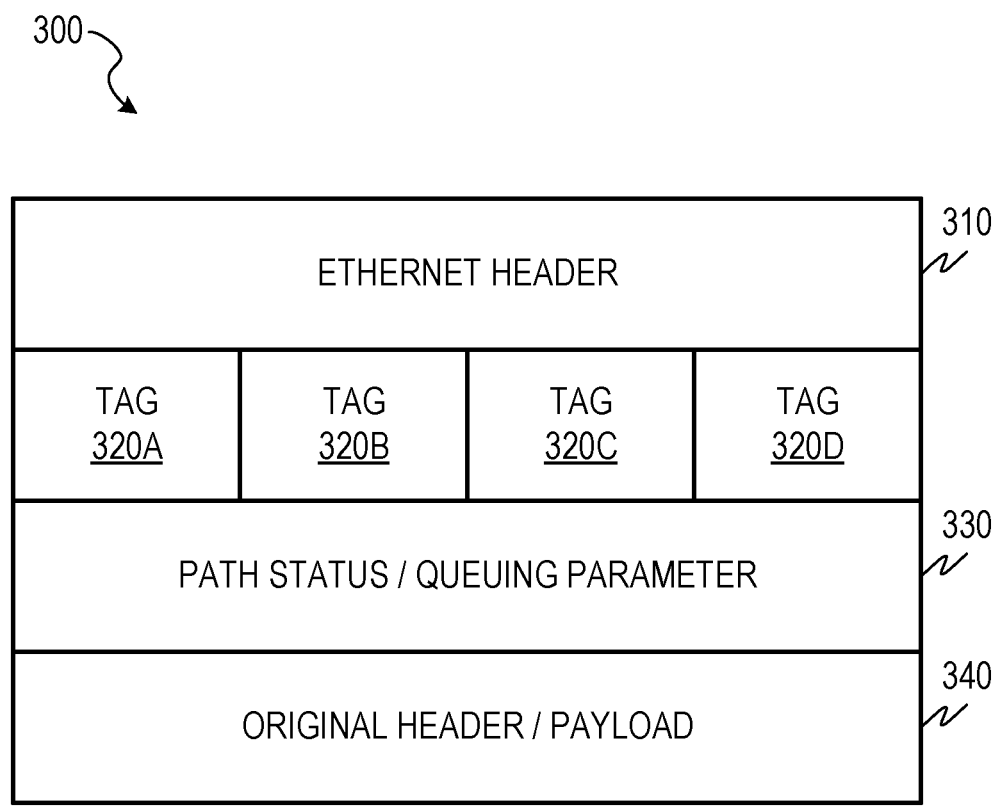
FIG. 3 is a block diagram illustrating a data packet format for use in a scale-out router, according to some example embodiments.

FIG. 3 is a block diagram illustrating a data packet format 300 for use in a scale-out router, according to some example embodiments. The data packet includes an Ethernet header 310, tags 320A-320D, a path status/queuing parameter 330, and an original header/payload 340. The Ethernet header 310 includes destination and source media access control (MAC) addresses. The tags 320A-320D indicate the path through the switches in the router. The path status/queuing parameter 330 indicates the current status of the data packet in following the path. The original header/payload 340 includes the data actually sent by the source device to the destination device. In some example embodiments, the Ethernet header 310 and the original header/payload 340 are unchanged from their typical use.

The data packet format 300 shows four tags 320A-320D, but the number of tags may be dependent on the number of layers of switches used in the scale-out router. For example, four tags is sufficient to store path information between any two line cards in a scale-out router having two layers of switches (e.g., the scale-out router 100), but cannot store a complete path between every pair of line cards in a scale-out router having three layers of switches (e.g., the scale-out router 200). In general, the number of tags may be twice the number of levels in the scale-out router.

The tags 320A-320D indicate the path to be taken within the router for the data packet. The path information for the data packet may have been retrieved by the line card receiving the data packet from the path table 410 of FIG. 4. For example, a packet being routed from the line card 110A to the line card 110B may set the tag 320A to indicate a first leaf switch (e.g., the leaf switch 120A), set the tag 320B to indicate the destination line card 110B, and set the remaining two tags 320C-320D to NULL, indicating that the last two tags are not used.

The path status/queuing parameter 330 indicates the current position in the path. For example, the path status/queuing parameter may be initialized to 1 by the source line card and incremented by each switch along the path that receives the packet prior to transmitting the packet to the next switch on the path.

FIG. 4 is a block diagram illustrating a database schema 400 for use in a scale-out router, according to some example embodiments. The database schema 400 includes the path table 410 and the usage table 450.

The path table 410 uses the schema 420, such that each row in the path table 410 includes a source identifier, a destination identifier, and a path. Example rows 430A-430B and 440A, 440B, 440C, 440D, 440E, 440F, 440G, and 440H are shown. The rows 430A-430B indicate that the source line card is A (e.g., the line card 110A) and the destination line card is B (e.g., the line card 110B). The two rows 430A-430B indicate different paths that can be used to route data packets from the source line card to the destination line card. The rows 440A-440H indicate that the source line card is A and the destination line card is H (e.g., the line card 110H). The eight rows 440A-440H indicate different paths that can be used to route data packets from the source line card to the destination line card. In a complete example path table 410 for the scale-out router 100, one or more rows would be present for every combination of source and destination line cards. Nonetheless, the total data consumed by the path data table 410 is small. Even with eight rows per source/destination pair, only 448 rows are used to describe every path in the router 100. If one-byte identifiers are used for the source, the destination, and each of the four positions on the path, the entire table is 2,688 bytes. Thus, in some example embodiments, the entire path table 410 is replicated for each line card and stored in high-speed memory within the line card itself. Additionally, the actual number of rows per source/destination pair may be reduced for pairs that are within the same pod.

The usage table 450 uses the schema 460, such that each row in the usage table 450 includes a switch identifier and a fill depth. The usage table 450 includes one row 470A, 470B, 470C, 470D, 470E, 470F for each of the intermediate switches in the scale-out router 100. The fill depth value indicates the number of pending communication requests in the output queue of the corresponding switch. In some example embodiments, when multiple paths are available, the path used is based on one or more of the fill depth values. For example, comparing the path of row 430A with the path of row 430B, the fill depth of the switch L1 (used by the row 430A) is 3 and the fill depth of the switch L2 (used by the row 430B) is 0. Thus, the path of row 430B may be selected with the expectation this choice will cause the data packet to reach its destination more quickly. In various example embodiments, the fill depth values are used in various ways. For example, the path having the lowest fill depth at the first step may be selected, the path having the lowest value for the sum of the fill depths along the path may be selected, or the path having the lowest maximum value of fill depths along the path may be selected. Along with the path table 410, the usage table 450 may be stored in a database stored in memory integrated into each line card, in a separate memory corresponding to each line card, in a separate memory accessible by all line cards, or any suitable combination thereof. In some example embodiments, the usage table 450 is stored separately from the path table 410. For example, the fixed path table 410 may be duplicated and stored in memory integrated with each line card while the dynamic usage table 450 may be stored in a central location accessible to all line cards.

Figure 5:
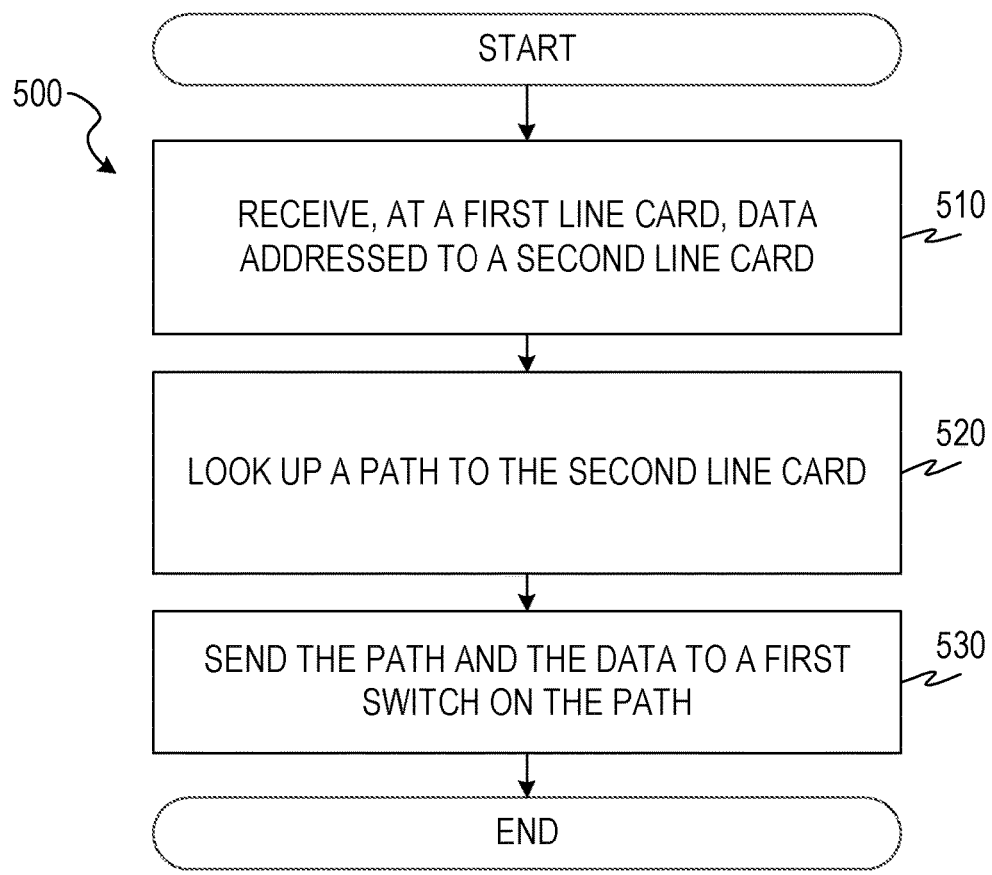
FIG. 5 is a flowchart illustration of a method of routing data within a scale-out router, according to some example embodiments.

FIG. 5 is a flowchart illustration of a method 500 of routing data within a scale-out router, according to some example embodiments. The method 500 includes operations 510-530.

In operation 510, a first line card (e.g., the line card 110A) receives data addressed to a second line card (e.g., the line card 110H). The received data may have originated from a device connected to the scale-out router over a network (e.g., the Internet).

The first line card searches a database determine what path information defines a path from the first line card to the second line card in operation 520. For example, the path information in an entry in the path table 410 having a source field that matches the first line card and a destination field that matches the second line card may be retrieved.

In operation 530, the first line card sends the retrieved path information and the data to a first switch on the path. For example, if the first switch on the path is the leaf switch 120A, the path information and the data are sent to the leaf switch 120A.

Figure 6:
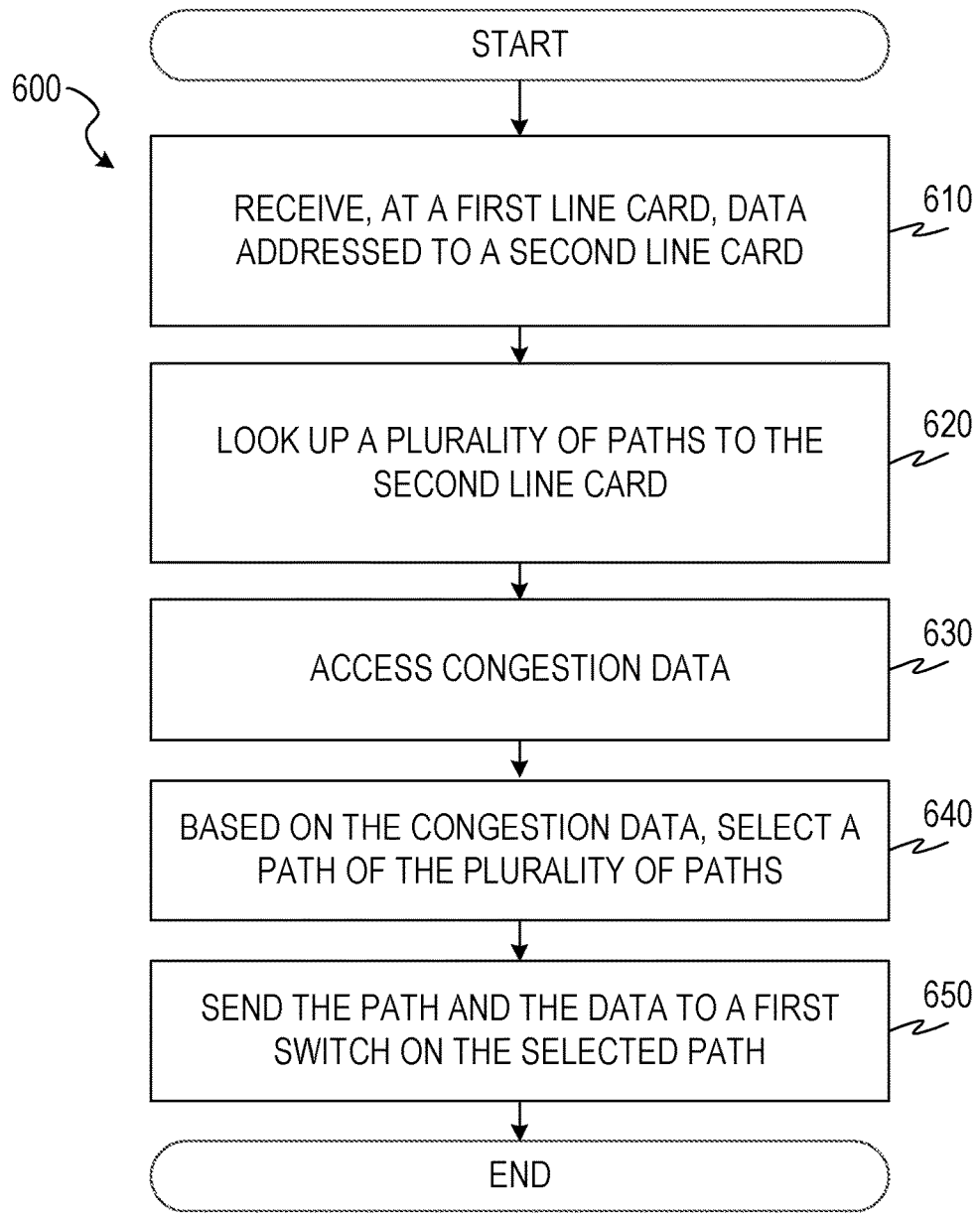
FIG. 6 is a flowchart illustration of a method of routing data within a scale-out router, according to some example embodiments.

FIG. 6 is a flowchart illustration of a method 600 of routing data within a scale-out router, according to some example embodiments. The method 600 includes operation 610-650.

In operation 610, a first line card (e.g., the line card 110A) receives data addressed to a second line card (e.g., the line card 110H). The first line card looks up path information for a plurality of paths to the second line card in operation 620. For example, the paths in all entries in the path table 410 having a source field that matches the first line card and a destination field that matches the second line card may be retrieved.

In operation 630, the first line card accesses congestion data for one or more switches in the scale-out router. For example, the set of all switches used in all paths of the plurality of paths may be identified and congestion data for each switch in the set of switches retrieved from the usage table 450. As another example, the set of switches in the first position of all paths of the plurality of paths may be used.

Based on the accessed congestion data, the first line card selects a path from the plurality of paths, in operation 640. For example, the path having the lowest total congestion may be selected or the path having the lowest congestion for the first switch may be selected.

In operation 650, the first line card sends the path information and the data to the first switch on the selected path. The selected path may not be the shortest path. For example, if the paths of rows 440A-440H are considered, and the path of row 440F is selected based on the congestion data, the path and the data are sent from the first line card to the switch labeled "L2" (e.g., the leaf switch 120B).

Figure 7:
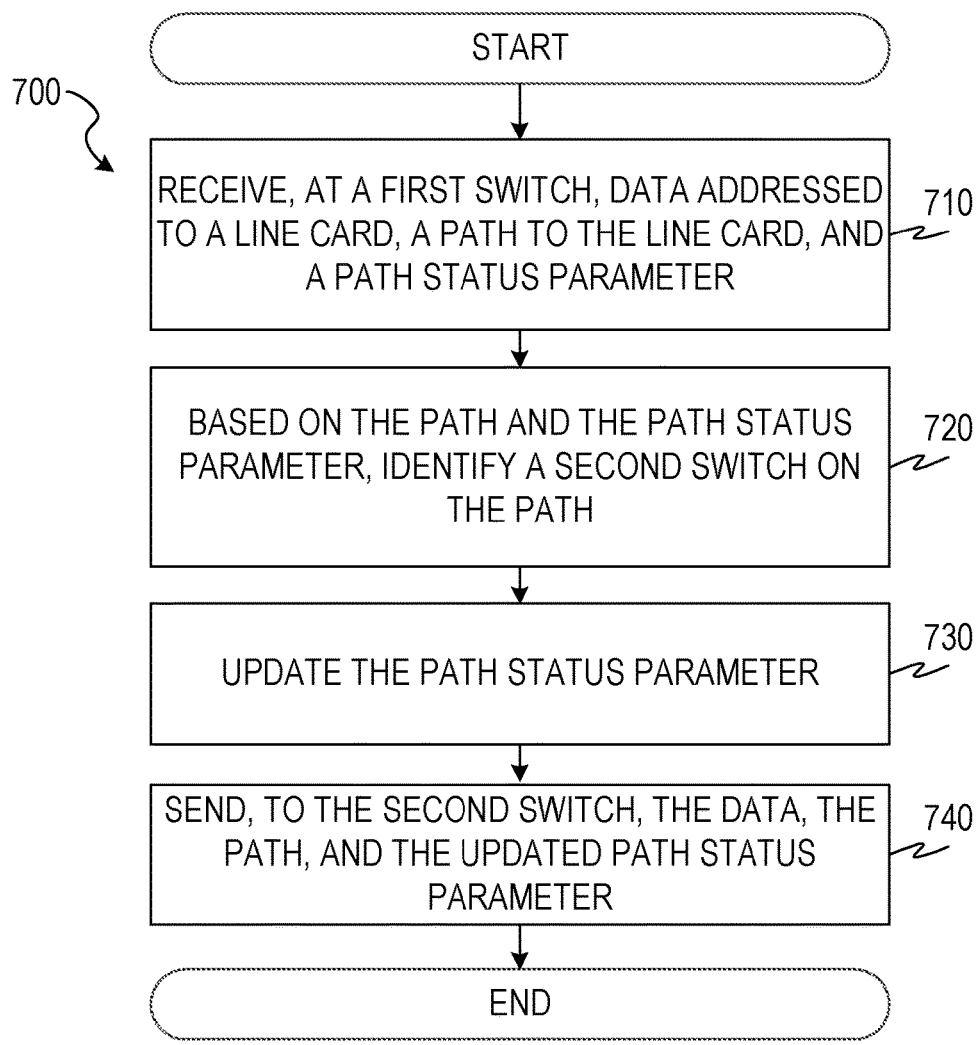
FIG. 7 is a flowchart illustration of a method of routing data within a scale-out router, according to some example embodiments.

FIG. 7 is a flowchart illustration of a method 700 of routing data within a scale-out router, according to some example embodiments. The method 700 includes operations 710-740.

In operation 710, a first switch (e.g., the leaf switch 120A) receives data addressed to a line card (e.g., the line card 110H), path information to the line card, and a path status parameter. As an example, consider the path of the row 440F of the path table 410: L2, S1, L4, H. In this example, the leaf switch 120A corresponds to the switch labeled "L2" in the path, and the path status parameter indicates the position of the data being transmitted along the path. For example, a value of 1 may be sent in the path status parameter to indicate that the data is being sent to the first switch in the path.

In operation 720, the first switch identifies a second switch on the path based on the path information and the path status parameter. For example, by incrementing the path status parameter and identifying the switch at the corresponding location in the path, the switch S1 (e.g., the spine switch 130A) is identified.

The first switch updates the path status parameter in operation 730 and, in operation 740, sends the data, the path information, and the updated path status parameter to the identified second switch. When each switch in the path repeats the method 700, the data will arrive at the last switch on the path, which may be the destination switch for the data packet. Once the data has reached the destination line card, the destination line card sends the data to the device using data in the Ethernet header 310 or the original header/payload 340. Any switch that can be configured to perform the method 700 can be used in the scale-out router, even switches by different manufacturers.

For example, when the leaf switches 120A-120D and the spine switches 130A-130B are configured to perform the method 700, a packet received by the line card 110A with a destination of the line card 110H sent along the path of the row 440F would be transmitted from the line card 110A to the leaf switch 120B, from the leaf switch 120B to the spine switch 130A, from the spine switch 130A to the leaf switch 120D, and from the leaf switch 120D to the line card 110H.

Figure 8:
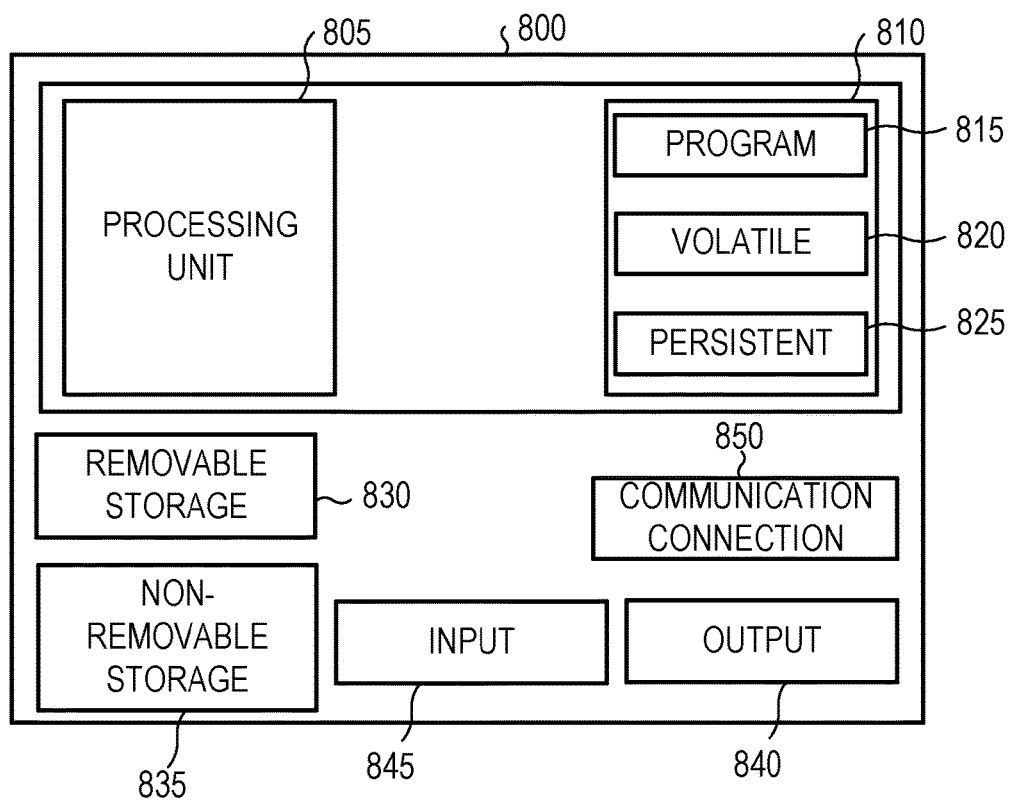
FIG. 8 is a block diagram illustrating circuitry for clients, servers, and switches for implementing algorithms and performing methods, according to example embodiments.

FIG. 8 is a block diagram illustrating circuitry for implementing algorithms and performing methods, according to example embodiments. All components need not be used in various embodiments. For example, the clients, servers, and cloud based network resources may each use a different set of components, or in the case of servers, for example, larger storage devices.

One example computing device in the form of a computer 800 may include a processing unit 805, memory 810, removable storage 830, and non-removable storage 835. Although the example computing device is illustrated and described as computer 800, the computing device may be in different forms in different embodiments. For example, the computing device may instead be a smartphone, tablet, smartwatch, or other computing device including the same or similar elements as illustrated and described with regard to FIG. 8. Devices, such as smartphones, tablets, and smartwatches, are generally collectively referred to as mobile devices or user equipment. Further, although the various data storage elements are illustrated as part of the computer 800, the storage may also or alternatively include cloud-based storage accessible via a network, such as the Internet or server based storage.

Memory 810 may include volatile memory 820 and persistent memory 825 and may store program 815. Computer 800 may include—or have access to a computing environment that includes—a variety of computer-readable media, such as volatile memory 820, persistent memory 825, removable storage 830, and non-removable storage 835. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input 845, output 840, and a communication connection 850. Output 840 may include a display device, such as a touchscreen, that also may serve as an input device. The input 845 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium (e.g., the program 815 stored in the memory 810) are executable by the processing unit 805 of the computer 800. A hard drive, CD-ROM, and RAM are some examples of articles including a non-transitory computer-readable medium such as a storage device. The terms computer-readable medium and storage device do not include carrier waves to the extent carrier waves are deemed too transitory. Computer-readable non-transitory media includes all types of computer readable media, including magnetic storage media, optical storage media, flash media and solid state storage media. It should be understood that software can be installed in and sold with a computer. Alternatively the software can be obtained and loaded into the computer, including obtaining the software through a physical media or distribution system, including, for example, from a server owned by the software creator or from a server not owned but used by the software creator. The software can be stored on a server for distribution over the Internet, for example.

Devices and methods disclosed herein may reduce time, processor cycles, and power consumed in routing data packets within scale-out routers. Additionally, when data packets are more efficiently routed, latency within the scale-out router may be reduced, thereby improving the performance of network applications making use of the scale-out router. The downstream effects of the performance improvement may reduce power consumption (e.g., by reducing non-productive idle cycles) of connected network devices.

Although a few embodiments have been described in detail above, other modifications are possible. For example, the logic flows depicted in the figures do not require the particular order shown, or sequential order, to achieve desirable results. Other steps may be provided to, or steps may be eliminated from, the described flows, and other components may be added to, or removed from, the described systems. Other embodiments may be within the scope of the following claims.

What is claimed is:

1. A router device comprising:
   a plurality of switches;
   a memory storage storing a database with path information including, for each path of a plurality of paths between respective line cards of a plurality of line cards in a network, a number of path tags for a respective number of switches of the plurality of switches on the path; and
   wherein a first line card of the plurality of line cards is configured to:
   receive data through a network interface of the first line card addressed to an address of a second line card of the plurality of line cards;
   select a path through the network from the first line card to the second line card from among a plurality of paths from the first line card to the second line card indicated by the path information stored in the database; and
   forward a data packet comprising the data, the address of the second line card, and the path information for the selected path, the path information including the number of path tags of the selected path that collectively indicate the selected path to the second line card from the first line card through the network.

2. The router device of claim 1, wherein a first switch of the number of switches on the selected path:
   receives the path information for the selected path and the data from the first line card;
   determines, from the path information, a second switch of the number of switches on the selected path; and
   sends the path information for the selected path and the data to the second switch on the selected path.

3. The router device of claim 2, wherein the second switch on the selected path:
   receives the path information for the selected path and the data from the first switch on the selected path;
   determines, from the path information for the selected path, a third switch of the number of switches on the selected path; and
   sends the path information for the selected path and the data to the third switch on the selected path.

4. The router device of claim 3, wherein the third switch on the selected path:
   receives the path information for the selected path and the data from the second switch on the selected path;
   identifies, from the path information for the selected path, the second line card; and
   sends the data to the second line card.

5. The router device of claim 1, wherein the first line card of the plurality of line cards further:

accesses congestion data of one or more switches of the plurality of switches; and selects the path from among the plurality of paths from the first line card to the second line card based on the accessed congestion data.

6. The router device of claim 5, wherein the congestion data comprises a fill depth for each switch of the one or more of the switches.

7. The router device of claim 1, wherein the memory storage comprising the database is integrated into the first line card.

8. The router device of claim 1, wherein each switch of the plurality of switches comprises a programmable data plane chip.

9. The router device of claim 1, wherein the number of path tags is four.

10. A router-implemented method for routing data in a network including a plurality of switches, the method comprising:

a first line card of a plurality of line cards:

receiving data via a network interface of the first line card, the data being addressed to a second line card of the plurality of line cards;

retrieving, from a database, path information for multiple paths through the network from the first line card to the second line card, the database including, for each path of the multiple paths from the first line card to the second line card, a number of path tags for a respective number of switches of the plurality of switches on the path;

selecting one of the multiple paths based on the path information for the multiple paths; and sending a data packet comprising the data and path information including the number of path tags of the selected path, the path tags collectively indicating the path to a first switch of the number of switches on the selected path.

11. The router-implemented method of claim 10, further comprising:

the first switch on the selected path:

receiving the path information for the selected path and the data from the first line card;

determining, from the path information for the selected path, a second switch of the number of switches on the selected path; and sending the path information for the selected path and the data to the second switch on the selected path.

12. The router-implemented method of claim 11, further comprising:

the second switch on the selected path:

receiving the path information for the selected path and the data from the first switch on the selected path;

determining, from the path information for the selected path, a third switch of the number of switches on the selected path; and sending the path information for the selected path and the data to the third switch on the selected path.

13. The router-implemented method of claim 12, further comprising:

the third switch on the selected path:

receiving the path information for the selected path and the data from the second switch on the selected path;

identifying, from the path information for the selected path, the second line card; and sending the data to the second line card.

14. The router-implemented method of claim 13, further comprising:

the first line card of the plurality of line cards:

accessing congestion data of one or more switches of the plurality of switches; and selecting the path from among the plurality of paths from the first line card to the second line card based on the accessed congestion data.

15. The router-implemented method of claim 14, wherein the congestion data comprises a fill depth for each switch of the one or more of the switches.

16. The router-implemented method of claim 10, wherein the database is stored in a non-transitory memory storage that is accessible by each of the plurality of line cards.

17. A non-transitory computer-readable media storing computer instructions that, when executed by a first line card of a plurality of line cards, cause the first line card to perform the steps of:

receiving data via a network interface of the first line card, the data being addressed to a second line card of the plurality of line cards;

retrieving, from a database, path information for multiple paths through a network from the first line card to the second line card, the database including, for each path of the multiple paths from the first line card to the second line card, a number of path tags for a respective number of switches of the plurality of switches on the path;

selecting one of the multiple paths based on the path information for the multiple paths and sending a data packet comprising the data and a path information including the number of path tags of the selected path, the path tags collectively indicating the path to a first switch of the number of switches on the selected path.

18. The non-transitory computer-readable media of claim 17, wherein the steps further comprise:

accessing congestion data of one or more switches of the plurality of switches; and selecting the path from among the plurality of paths from the first line card to the second line card based on the accessed congestion data.

19. The non-transitory computer-readable media of claim 18, wherein the congestion data comprises a fill depth for each switch of the one or more of the switches.

* * * * *